United States Patent [19]

Kleinhagen, Jr.

[11] Patent Number: 4,623,047

[45] Date of Patent: Nov. 18, 1986

[54] AUTOMATIC BRAKE ADJUSTMENT ASSEMBLY

[75] Inventor: Charles W. Kleinhagen, Jr., Battle Creek, Mich.

[73] Assignee: Eaton Corporation, Cleveland, Ohio

[21] Appl. No.: 798,499

[22] Filed: Nov. 15, 1985

[51] Int. Cl.$^4$ ............................................. F16D 65/38
[52] U.S. Cl. ................................ 188/196 BA; 74/110; 188/72.6; 188/343
[58] Field of Search .............. 188/343, 79.5, 196, 188/72.6, 72.7, 72.8, 71.8, 71.9, 329, 330, 332, 72.3; 192/111 A; 74/110

[56] References Cited

U.S. PATENT DOCUMENTS

| | | | |
|---|---|---|---|
| 3,949,840 | 4/1976 | Cumming et al. | 188/196 BA X |
| 3,966,028 | 6/1976 | Anderson et al. | 188/71.9 X |
| 4,019,612 | 4/1977 | Mathews et al. | 188/196 BA |
| 4,064,973 | 12/1977 | Deem et al. | 188/71.9 X |
| 4,088,206 | 5/1978 | Garrett et al. | 188/79.5 K X |
| 4,235,312 | 11/1980 | Garrett et al. | 188/343 X |
| 4,351,419 | 9/1982 | Garrett et al. | 188/71.9 |
| 4,535,875 | 8/1985 | Ingram et al. | 188/343 X |
| 4,553,646 | 11/1985 | Carré et al. | 188/196 BA |

Primary Examiner—Douglas C. Butler

Attorney, Agent, or Firm—C. H. Grace; A. E. Chrow

[57] ABSTRACT

Disclosed is an automatic brake adjustment assembly (50) for maintaining a desired disengaged clearance (c) between a frictional brake lining (17) and a moveable object to be braked. Assembly (50) includes a cam member (2) that is moved in opposite axial directions upon the respective engagement and disengagement of the brake by the operator causing a cam follower (10) to move a nut (16) in corresponding opposite axial directions which in turn is threadingly engaged with and operates to move a piston (18) in opposite axial directions along a frame (24) and accordingly cause brake lining (17) to move towards and away from the object to be braked. Cam member (2) carries a spring force generation member in the form of rack (38) that is loosely held until the axial movement of cam member (2) exceeds a predetermined distance (n) above which a portion of a ramp (34) of rack (38) engages lip (33) of at least one pin (32) fixed to frame (24) and restrains rack (38) sufficiently that an end thereof is able to engage and rotate gear (12) which, in turn, rotates nut (16) which advances piston (18) and liner (17) towards the object to be braked a distance sufficient to maintain desired clearance (c).

6 Claims, 2 Drawing Figures 4,623,047

AUTOMATIC BRAKE ADJUSTMENT ASSEMBLY

INTRODUCTION

This invention relates generally to an automatic brake adjustment assembly that is able to maintain a substantially constant desired clearance between the frictional lining of a brake shoe and a moveable object to be braked such as a vehicular wheel rotor and which is simple in design and inexpensive to manufacture.

BACKGROUND OF THE INVENTION

Various types of automatic brake slack adjusting or brake clearance adjusting mechanisms are known in the art. In general, they have characteristically been complicated in design and expensive to manufacture. Examples of adjusters that utilize a pawl to rotate a nut that in turn advances a piston to maintain desired disengaged clearance between a brake shoe and a surface such as a wheel rotor to be braked are respectively disclosed in U.S. Pat. Nos. 3,949,840 and 3,966,028, the disclosures of all which are incorporated herein by reference. An example of a brake adjusting mechanism of complex design that utilizes a pawl and toothed ring to provide automatic adjustment of brake clearance is disclosed in U.S. Pat. No. 4,064,973, the disclosure of which is incoporated herein by reference. An example of a brake adjuster that utilizes a complicated worm and worm gear arrangement to adjust clearance between a brake shoe and an object to be braked is disclosed in U.S. Pat. No. 4,088,206, the disclosure of which is incorporated herein by reference. An example of an automatic slack adjuster that utilizes a gear and rack arrangement in conjunction with a clutch is diclosed in U.S. Pat. No. 4,019,612, the disclosure of which is incorporated herein by reference. None of the above, however, disclose or suggest a simplified means by which to automatically maintain a desired clearance between a brake shoe lining and an object to be frictionally braked by the lining that is inexpensive to manufacture.

Heretofor, brake clearance adjusters have been unable to utilize the full stroke or travel of the driving piston or cylinder requiring high precision and high cost components to provide an adjuster motion that is characteristically some fraction of the piston motion whereas the brake adjustment assembly of the present invention features the use of lower cost components having broader tolerances which, due to its simple and unique design, is able to utilize directly the travel distance of the driving piston or cylinder to characteristically provide a more favorable adjuster motion to lining clearance ratio which advantageously reduces the precision required for the adjustment mechanism.

SUMMARY OF THE INVENTION

Accordingly, it is an object of this invention to provide an adjustment assembly that is able to automatically maintain a desired disengaged clearance between a brake shoe lining and an object to be frictionally braked by the lining.

It is another object of this invention to provide an automatic brake adjustment assembly for maintaining a desired clearance between a frictional brake lining and an object such as a vehicular wheel rotor in the brake disengaged condition that is highly effective and inexpensive to manufacture and repair.

DESCRIPTION OF SOME PREFERRED EMBODIMENTS

Figure 1:
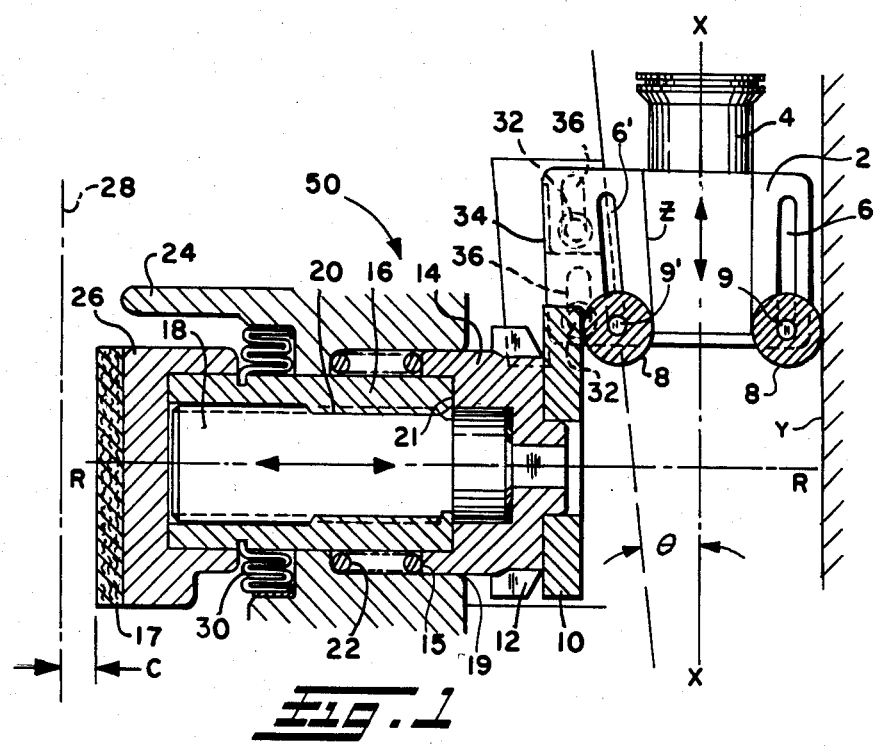
FIG. 1 shows a plan view in partial cross-section of a brake adjuster assembly 50 made in accordance with the invention.

FIG. 1 shows a preferred embodiment of brake adjustment assembly 50 of the invention. Assembly 50 comprises a cam member 4 preferably adapted to be driven, for example, by piston of an air cylinder of a vehicle air brake but which may be driven by any suitable means well known to those skilled in the art of brake design. Cam member 4 is operative to move downwardly along axis "X" as viewed in FIG. 1 upon application of the brake by an operator and to move upwardly along axis "X" upon release of the brake by the operator.

Retainer cage member 2 is carried by cam 4 and moves reciprocally upwardly and downwardly in unison with cam 4. Cage 2 is provided with a pair of spaced-apart elongate slots 6 and 6' of which slot 6 is preferably aligned substantially parallel to axis "X" and slot 6' is cambered at the angle "0" from axis "X".

Floating pins 9 and 9' extend respectively through slots 6 and 6' and support respective roller members 8 and 8' as shown in FIG. 1. Roller 8 bears against a suitable fixed reaction surface "Y" that is preferably substantially parallel to axis "X" along which cam 4 moves reciprocally upon application and release of the brake by the operator.

Cam 4 is provided with a cambered surface "Z" which bears against roller 8' and which is preferably substantially parallel to the elongate axis of slot 6' which is inclined from the axis of movement of cam 4 by the angle "0". It can readily be seen that, as cam 4 moves downwardly upon application of the brake, surface "Z" forces roller 8' away from roller 8 towards the viewer's left which movement is uninhibited due to surface "Z" and the axis of slot 6' having substantially the same inclination angle "0" from the axis of movement of cam 4.

Figure 2:
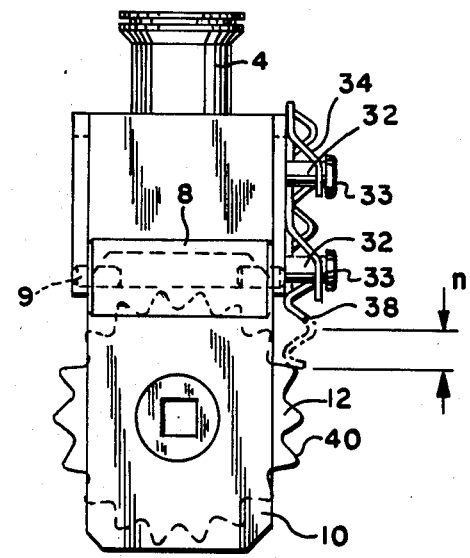
FIG. 2 shows a side view of the adjuster of FIG. 1.

Roller 8 bears against cam follower 10 as shown in FIG. 1. Cam follower 10 is piloted upon flange member 14 and is preferably rotatable thereabout. Although cam follower 10 may have any suitable shape in a plane parallel to pin 9', it preferably has a rectangular shape as shown in FIG. 2.

Flange member 14 is fixedly secured coaxially about an end of shaft or piston member 18 having a central axis "R" that is preferably substantially orthoginal to axis "X". Although the assembly of the invention preferably includes flange member 14, it is to be understood that cam follower 10 and gear member 12 hereinafter described may be secured directly to shaft 18 when desired. Shaft member 18 extends through an opening 19 in frame 24 and is mounted for rotation and for reciprocal axial movement with respect thereto. Flange member 14 and shaft member 18 are mounted so that they are able to rotate in unison about and to move reciprocally along axis "R".

An adjustment nut member 16 is disposed coaxially about shaft member 18 within opening 19 through frame 24. Nut member 16 is provided with threads 20 which threadingly engage threads in the outer surface of shaft member 18. Nut member 16 like flange member 14 is mounted to move axially along axis "R" towards the viewer's left upon application of the brake but is restricted against rotation about axis "R". An annular lip 15 of flange member 14 surrounds nut member 16 against which is disposed a suitable biasing means such as coiled spring 22 that engages frame 24 and is adapted to urge flange member 14 and cam follower 10 axially along axis "R" towards the viewer's right upon release of the brake. Spring 22 has sufficient force to move cam follower 10, flange member 14, shaft member 18, nut member 16 and hereinafter described brake shoe 26 and lining 17 a distance "C" away from drum 28 upon release of the brake. Flange member 14 is provided with an annular shoulder 21 facing towards nut member 16. Shoulder 21 rotates relative to nut member 16 upon rotation of flange member 14 while the threaded engagement between shaft member 18 and nut member 16 causes nut member 16 to advance towards the viewer's left upon rotation of shaft member 18 upon application of the brake when a correction is required to maintain clearance "C".

A suitable sealing device such as flexible bellows seal 30 is preferably employed between frame 24 and nut 16 as shown in FIG. 1 to prevent contamination from damaging the various components of assembly 50.

A brake shoe member 26 is preferably fixedly secured to an opposite end of nut member 16. Brake shoe 26 is provided with a frictional lining 17 secured to the side thereof facing towards an object to be braked by liner 17 such as rotary brake drum 28 of a vehicular wheel. Drum 28 and lining 7 are separated by an initial desired clearance "C" in the brake disengaged condition.

In operation of assembly 50, without considering clearance adjustment features, application of the brake causes cam 4 to move downwardly causing surface "Z" to urge cam follower 10, flange member 14 and shaft member 18 a distance along axis "R" sufficient to provide braking engagement between lining 17 and drum 28. The force involved in causing such movement is sufficient to overcome the biasing force of spring 22 in the opposite direction along axis "R".

The manner in which assembly 50 is able to automatically maintain a desired clearance "C" between liner 17 and drum 28 in the brake disengaged condition is provided by interaction between rack 38 and gear 12 hereinafter described.

Assembly 50 includes at least one and preferably two pins 32 that are fixedly secured relative to the reciprocal movement of cam 4 and cage member 2. Pins 32 extend through respective slots 36 in rack 38 in a plane preferably normal to the plane of axis "R".

Rack member 38 is made from a material having sufficient resiliency to provide a means for rotating gear member 12 as hereinafter described. Pins 32 respectively include lips 33 at their outer end which, in the brake released condition, hold rack 38 loosely to retainer cage 2. Rack 38 is preferably "U" shaped and has an undulated configuration with slots 36 being in one leg of the "U" and the other leg extending preferably orthoginally towards axis "R" of flange member 14. Rack 38 is provided with ramps 34 respectively at the location of slots 36 as shown in FIG. 2.

Gear member 12 is coaxially aligned with and fixedly secured to flange member 14 and is preferably an integral part thereof. Gear member 12 includes teeth 40 which face generally orthoginally away from axis "R" which is also the rotational axis for gear member 12. Rotation of gear member 12, upon application of the brake, causes flange member 14 and shaft member 18 to rotate about axis "R" which in turn causes nut member 16 to move axially towards drum 28 while cam follower 10 preferably remains relatively stationary due to its rotatable mounting upon flange member 14 previously described.

When the clearance between lining 17 and brake drum 28 is greater than its desired distance "C", gear member 12 is rotated by an end of rack 38 which has been brought into contact with teeth 40 upon travel of cam 4 a distance greater than distance "n" shown in FIG. 2 upon application of the brake. Preferably, the upper end (not referenced) of slots 36 is located so as to move the end of rack member 38 away from teeth 40 when the brake is released. Downward movement of cage member 2 carried by cam 4 causes ramps 34 to move along pins 39 causing rack 38 to move towards lips 33 resulting in increasing restraint in movement of rack 38 as ramps 34 come close. Ramps 34 are provided with sufficient slope to insure that sufficient rigidity is imparted in the securement between rack 38 and cage 2 to enable the end of rack 38 in contact with teeth 40 to overcome the rotational inertia required to rotate gear 12.

In operation, downward movement of cam 4 causes roller 8' to press against cam follower 10 which in turn urges gear 12, flange member 14 and shaft member 18 axially along axis "R" which in turn causes liner 17 to move into braking engagement with drum 28. Whilst at the same time the downward movement of cage member 2 causes ramps 34 of rack 38 to move towards lips 33 of pins 32 and restrain movement of rack 38 which in turn provides rack 38 with sufficient rigidity such that its end is able to rotate gear 12 which in turn rotates shaft member 18 which in turn advances nut member 16, brake shoe 26, and lining 17 towwards the viewer's left relative the axial position of shaft member 16.

Rack member 38 is made from a material having sufficient resilience such that is is able to rotate gear 12 upon application of the brake but will slip or ratchet across teeth 40 upon engagement between liner 17 and drum 28 which creates a frictional force between the threaded connection between nut member 16 and shaft member 18 which opposes rotation of shaft member 18 which in turn opposes rotation of gear 12.

The amount of axial movement of flange member 14, cam follower 10, shaft member 18, gear 12, nut member 16, brake shoe 26 and lining 17 along axis "R" without clearance adjustment rotation is generally a function of the angle "0" selected to provide a particular mechanical advantage for a particular application with the amount of rotation of gear 12 being predetermined by the pitch diameter of gear 12 selected and the axial advancement of nut member 16 relative shaft member 16 being predetermined by the pitch of the threaded engagement between shaft member 18 and nut member 16.

Generally, the length of slots 36 is equal to the distance "n" to enable rack 38 to be sufficiently restrained by legs 33 as previously described to enable rack 38 to rotate gear 12 an amount to substantially maintain clearance "C" in the brake released condition. Use of the travel of cam 4 directly to provide the adjustment motion for the adjuster of the invention enables 1/1 relationship between adjuster motion and travel of cam member 4 which in turn enables the use of simple and low cost components of the brake adjustment assembly of the invention herein described.

What is claimed is:

1. An automatic brake adjustment assembly for maintaining a substantially constant desired clearance between a frictional brake lining and an object to be braked, in the brake released condition, said assembly comprising:
- a cam member axially moveable in opposite directions in response to application and release of the brake,
- a cage member carried by the cam member,
- a shaft or piston member mounted for rotation and for reciprocal axial movement along a frame,
- a nut member disposed coaxially about the piston member, said nut member operatively connected to the brake lining and having at least a portion thereof threadingly engaged with the shaft member for rotation and for reciprocal axial movement therewith relative the frame,
- a gear member operative to rotate the shaft member,
- a cam follower secured to the shaft member and operative to move the shaft member and the gear member axially relative the frame in response to application of the brake,
- means for biasing the cam follower against the cam member,
- gear rotation means operative to engage the gear member,
- means for holding the gear rotation means loosely to the cage member in the brake released condition,
- and means for providing increased restraint upon the gear rotation means sufficient to rotate the gear member upon application of the brake,
- said assembly operable such that, upon application of the brake, the cam member urges the cam follower and the gear member and the shaft member axially for a distance sufficient to cause the nut member to move the brake lining into braking engagement with the object whilst the means for holding the gear rotation means increases restraint thereupon sufficiently to enable the gear rotation member to rotate the gear member and enable the gear member to rotate the shaft member causing the nut member to advance the lining towards the object a distance sufficient to maintain the desired clearance therebeween in the brake released condition and said brake rotation means is operative to slip relative to the gear member to prevent further advancement of nut member relative to the shaft member towards the object upon braking engagement therebetween.

2. The assembly of claim 1 including a flange member fixedly secured to the shaft member with said cam follower being rotatably secured thereto and said gear member being fixedly secured thereto.

3. The assembly of claim 1 wherein the gear rotation means comprises a rack member having at least one ramp having a slot therethrough and the means for holding the rack member loosely to the cage member comprises at least one pin that extends through the slot and is in fixed relationship relative the movement of the cage member and said means for providing said increased restraint upon the rack member is provided by cooperation between the ramp and restraining means included on the pin member.

4. The assembly of claim 3 wherein the restraining means included in the pin member for cooperating with the ramp comprises a lip on the pin member.

5. The assembly of claim 3 wherein the rack member has an undulated configuration.

6. The assembly of claim 1 wherein the motion providing the adjustment rotation is directly related to the travel available from the cam member by a ratio of 1 to 1.

* * * * *